(12) United States Patent
Herr et al.

(10) Patent No.: US 11,439,171 B2
(45) Date of Patent: Sep. 13, 2022

(54) EDIBLE 3D PRINTER FILAMENT

(71) Applicants: Ashley G. Herr, Chestertown, MD (US); Paige Elizabeth Colen, Rock Hall, MD (US)

(72) Inventors: Ashley G. Herr, Chestertown, MD (US); Paige Elizabeth Colen, Rock Hall, MD (US)

( * ) Notice: Subject to any disclaimer, the term of this patent is extended or adjusted under 35 U.S.C. 154(b) by 649 days.

(21) Appl. No.: 15/958,611

(22) Filed: Apr. 20, 2018

(65) Prior Publication Data

US 2018/0310601 A1    Nov. 1, 2018

Related U.S. Application Data

(62) Division of application No. 14/846,792, filed on Sep. 6, 2015, now abandoned.
(Continued)

(51) Int. Cl.
*A23L 29/212* (2016.01)
*B33Y 70/00* (2020.01)
(Continued)

(52) U.S. Cl.
CPC ........... *A23L 29/212* (2016.08); *A23L 29/206* (2016.08); *A23P 30/20* (2016.08); *B29C 64/118* (2017.08); *B33Y 70/00* (2014.12)

(58) Field of Classification Search
None
See application file for complete search history.

(56) References Cited

U.S. PATENT DOCUMENTS

| | | | | |
|---|---|---|---|---|
| 4,892,932 A | * | 1/1990 | Rauch | B01D 1/18 264/11 |
| 2005/0089548 A1 | * | 4/2005 | Virgalitto | A61K 9/006 424/440 |

(Continued)

OTHER PUBLICATIONS

Andrews: Hot-melt extrusion: an emerging drug delivery Technology; published Jan. 1, 2009 at: http://www.pharmtech.com/hot-melt-extrusion-emerging-drug-delivery-technology (Year: 2009).*

(Continued)

*Primary Examiner* — Patricia A George
(74) *Attorney, Agent, or Firm* — Royal W. Craig; Gordon Feinblatt LLC

(57) ABSTRACT

The present invention relates to an edible 3D printer filament that incorporates an active ingredient such as an oil (e,g, cannabis) extract for taste, odor or medicinal benefit, and which is capable of retaining this benefit despite the repeated thermal extrusion involved in 3D printing. The filament is made by mixing the active ingredient extraction with polyvinylpyrrolidone (PVP), starch, and super disintegrant, and spray drying the result to a powderized form. The powderized water soluble polymer with active ingredient is mixed with excipient ingredients including a plasticizer, colored/dyed arabic gum, a gelling agent, fillers, flour, a binding or thickening agent (which also gives the benefit of being a stabilizer), a lubricant, and a preservative, and is heated. The result is hot melt extruded into a filament with a diameter of 1.75 mm or 3 mm. When printed, the thermoplastic has good strength, stiffness, and physical properties, and can be 3D-printed in any shape.

15 Claims, 1 Drawing Sheet

Related U.S. Application Data

(60) Provisional application No. 62/046,923, filed on Sep. 6, 2014.

(51) Int. Cl.
*A23P 30/20* (2016.01)
*B29C 64/118* (2017.01)
*A23L 29/206* (2016.01)

(56) References Cited

U.S. PATENT DOCUMENTS

| | | | | |
|---|---|---|---|---|
| 2005/0244493 | A1* | 11/2005 | Withiam | A61K 9/0056 424/464 |
| 2008/0274194 | A1* | 11/2008 | Miller | A61K 9/146 424/489 |
| 2009/0047350 | A1* | 2/2009 | Bangalore | A61K 9/0056 424/486 |
| 2013/0238118 | A1* | 9/2013 | Haas | G07F 17/0064 700/231 |
| 2016/0136887 | A1* | 5/2016 | Guillemette | B29C 69/001 428/375 |

OTHER PUBLICATIONS

English: 3D Printer Filament Buyer's Guide; ProtoParadigm; published on Jun. 13, 2012 at: http://www.protoparadigm.com/news-updates/3d-printer-filament-buyers-guide/ (Year: 2012).*

McPartland: Cannabis and Cannabis Extracts: Greater Than the Sum of Their Parts?; © 2001 by The Haworth Press, Inc. (Year: 2001).*

Guillemette: PCT/US2014/066252; published May 28, 2015 (Year: 2015).*

* cited by examiner

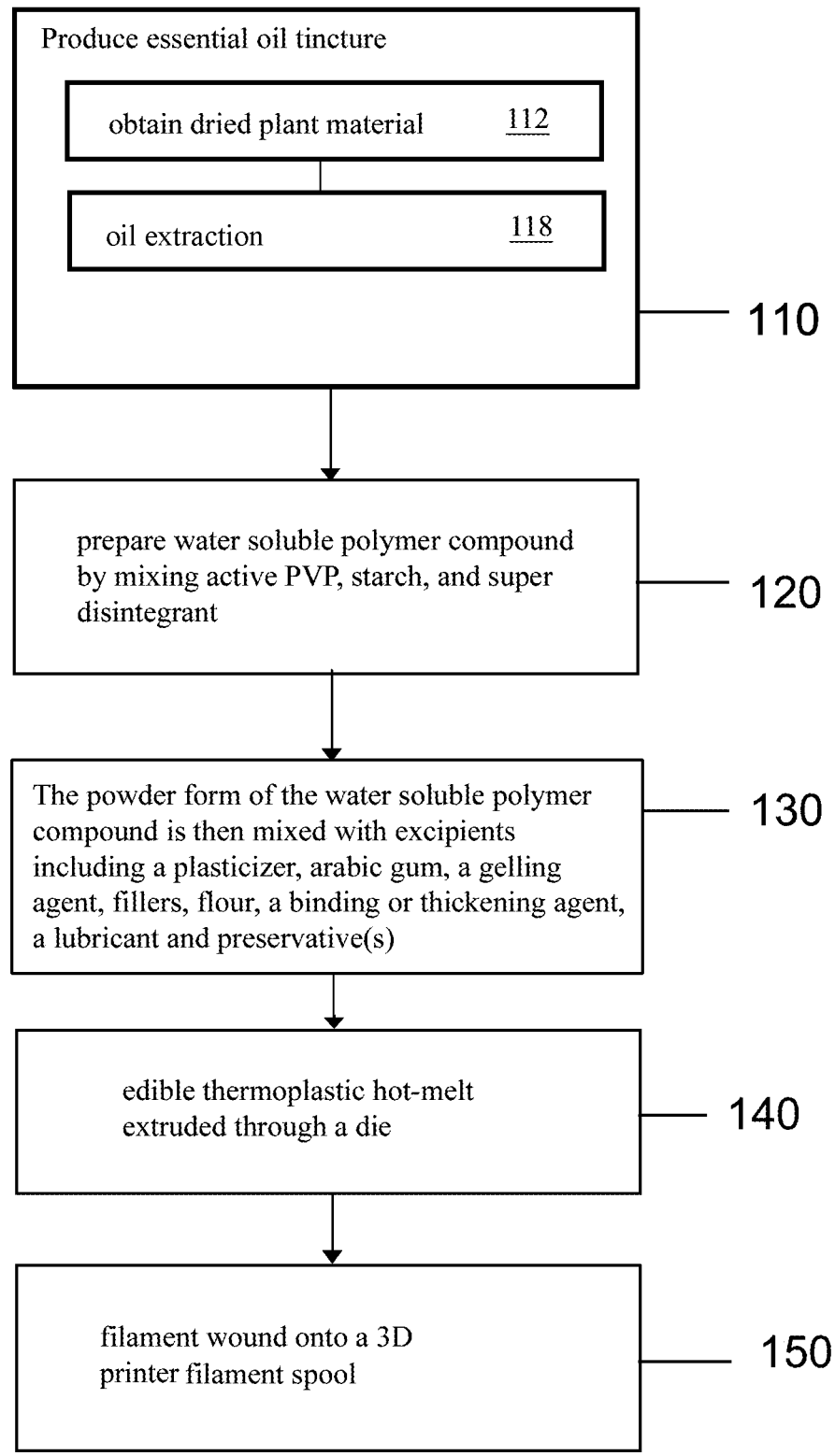

EDIBLE 3D PRINTER FILAMENT

CROSS-REFERENCE TO RELATED APPLICATION(S)

The present application is a division of U.S. patent application Ser. No. 14/846,792 filed on Sep. 6, 2015 which in turn derives priority, from U.S. Provisional Application Ser. No. 62/046,923 filed 6 Sep. 2014.

BACKGROUND OF THE INVENTION

Field of the Invention

The present invention relates generally to 3D printing, and more specifically, to an edible water-soluble polymer 3D priming filament.

Description of the Background

3D Printing is a fast growing industry with a bright future. No longer constrained to high end fabrication shops, there is an expanding consumer demand for 3D printers. Indeed, the 3D printer and services market was worth $2.2 billion in 2012 and is growing at 29% annually. 3D printers and accessories are currently being sold at consumer focused retail stores such as Best Buy® and Lowes®, which stands as evidence that 3D printers may become mass-market products in the very near future.

3D printers are now capable of making three-dimensional objects of almost any shape through an additive process in which successive layers of material are laid down under computer control. 3D printers are especially well-suited for making precision prototypes, in a wide range of materials. However, they have the potential to completely transform the way we make many mainstream products and to impact numerous major industries.

There have been attempts to adapt 3D printer technology for the printing of foods. For example, PCT application number PCT/US2014/039170 published Nov. 27, 2014 shows a 3D printer 3D printer system in which different food materials are contained in respective capsules, and the 3D printer system auto-determines the contents of each capsule. A heating device adjusts the temperature of the material contained in the capsules based on the parameters and properties associated with the food materials, and the materials are extruded therefrom in an additive process. This and other known efforts at 3D printing of food rely on a substantial modification of the core printing technology to extrude the food material.

Conventional 3D printers use a spool of filament. There are many types of filament available. PLA (Polylactic Acid) and Acrylonitrile butadiene styrene (ABS) are the most commonly used desktop 3D printing materials, both thermoplastics.

PLA (short for polylactic acid) is a plastic made of renewable starches such as corn and sugarcane. The filaments are made by thermal extrusion, PLA has a melting temperature 344-352° F., and PLA's extrusion temperature can vary between 320 and 430° F.

ABS (short for acrylonitrile butadiene styrene) is a common thermoplastic that is essentially petroleum based. It melts at its glass transition temperature of approximately 221° F.

Each of the foregoing plastics is hot-melt extruded into a filament and the filament is wound onto a spool for use with the 3D printer. The printer essentially re-extrudes the filament during 3D printing. Printer extrusion temperature can vary between 0 and 500° F. (0-260° C.). Software controlling the printer calculates the extrusion volume based on the filament diameter, the diameter of the nozzle and the flow rate. A calculated length of filament is then pushed out of the hot nozzle.

The two-step heating required of conventional 3D printer filaments destroys many of the characteristics of food. Oils have been extracted from plants for thousands of years, some of these vegetable oils are consumed directly, and others indirectly as ingredients in food. Terpenes are one of the organic compounds extracted from certain plants to provide aromas, flavoring, and therapeutic effects. Some oils, such as olive, sesame, or almond oil, are used specifically for the flavor they impart. There are a variety of methods of oil extraction, such as distillation, solvent extraction, expression, enfleurage, and super critical Carbon Dioxide extraction. The results of the extracts are either essential oils, absolutes, tinctures, concretes, or butters, depending on the amount of waxes and solids in the extracted product. Ethanol extraction is a type of solvent extraction used to extract vegetable oil. The raw material is mixed with ethanol, which dissolves more of the oxidized aromatic constituents (alcohols, aldehydes, etc.), leaving behind the wax, fats, and other generally hydrophobic substances. The alcohol is evaporated under low-pressure, or with a rotary evaporator, leaving behind a "tincture" (a pure oil extract). The tincture may be further processed to remove any impurities that are still present from the solvent, extraction leaving a pure oil extract.

Heat, chemical solvents, or exposure to oxygen denature most aromatic compounds, either changing their odor character or rendering them odorless. This is an obstacle for 3D printing, which entails two distinct heating steps. The standard two-step heating required of 3D printers would theoretically destroy the taste, odor or efficacy of vegetable oil extracts. CO2 super critical extraction machine uses elevated heat and high pressure to get the active ingredients out of many plant types. CO2 super critical extraction's low toxicity and low environmental impact makes it a desirable process as there is little to no denaturing of the terpenes. As there remains a need for a 3D printer filament suitable for use in conventional 3D printers that incorporates an oil extract for taste, odor or medicinal benefit, and retains this benefit throughout heating processes. This will facilitate custom 3D printing of "edible art" safe for consumption by people and animals. Such a 3D printing filament and method for manufacturing is disclosed and claimed herein.

SUMMARY OF THE INVENTION

Accordingly, there is provided an edible 3D printer filament that incorporates an oil extract for taste, odor or medicinal benefit, and which is capable of retaining this benefit despite repeated thermal extrusion.

An edible 3D printer filament is herein described that comprises an edible thermoplastic comprising 1 part active ingredient (in a liquid state, i.e. a tincture), combined with approximately 3.5 parts polyvinylpyrrolidone (PVP), approximately 1.5 parts modified starch and approximately 1 part super disintegrant,=. Ingredients are mixed using any standard mixing equipment=.

Powder derived from spray drying process is then used in combination with other excipient ingredients to achieve the correct mixture for final filament consistency. The ingredients for the filament can range in ratios depending on the active ingredient and the desired achievement of the filament, whether it be odor, taste, or medicinal benefit. The list of excipient ingredients for this mixture are as follows: active spray dried powder mixture, a plasticizer, arabic gum that has been colored with standard food grade dyes or colorants, a gelling agent, fillers, flour, a binding or thickening agent (which also gives the benefit of being a stabilizer), a lubricant and preservative(s). The final mixture is combined in stages over low heat so as to not loose active ingredient(s)' integrity. Once the added ingredients have melted and homogeneously been mixed the mixture is then removed from heat and meant to dry/cure in a cool, dry stable environment. The hardened mixture is then broken up and fed into an extruder with a die of 1.75 mm or 3 mm (diameters of standard 3D printer filaments). The filament that is extruded is allowed to dry/cure in a cool, dry stable environment.

BRIEF DESCRIPTION OF THE DRAWINGS

Other objects, features, and advantages of the present invention will become more apparent from the following detailed description of the preferred embodiment and certain modifications thereof, in which:

FIG. 1 is a flow chart of an exemplary method for producing an edible 3D filament for use in a conventional 3D printer according to the invention.

DETAILED DESCRIPTION OF THE PREFERRED EMBODIMENT

The present invention is an edible 3D printer filament that incorporates an extract for taste, odor or medicinal benefit, and which is capable of retaining this benefit despite repeated thermal extrusion. The 3D printer filament is composed of an edible thermoplastic formulated to retain taste, odor and/or medicinal benefit despite repeated extrusion, and to provide the intended benefit when consumed by people or animals.

The edible thermoplastic filament of the present invention has good processing flowability and excellent mechanical properties which make it suitable for 3D printing into any desired shape. In one currently preferred embodiment of the present invention the edible thermoplastic filament contains approximately (1) part active ingredient (in a liquid state, i.e. a tincture), combined with approximately (3.5) parts polyvinylpyrrolidone (PVP), approximately (1.5) parts modified starch (such as a ratio of approximately 1:15 starch to citric acid, used as a plasticizer), such as Prejel PA5PH from DFE pharma® (a cold water swelling fully pregelatinised potato starch in the form of a white, free flowing powder), and approximately (1) part super disintegrant, such as Lachtochem® powder, a milled lactose powder likewise available from DFE pharma®. Ingredients are mixed using any standard mixing equipment such as an ultrasonication machine, centrifuge, etc. Mixture is spray dried using a spray drier such as, for example, a BÜCHI Mini Spray Dryer B-290 (BÜCHI Labortechnik AG, Flawil, Switzerland). Mixture is spray dried with approximate parameters of an intake temperature in a range of 110-130° C., an aspiration rate within a range of of 065-100%, pump #001, nozzle cleaner set at a 4, and Q-flow at 30.

Powder derived from spray drying process is then used in combination with other excipient ingredients to achieve the correct mixture for final filament consistency. The excipient ingredients for the filament range in ratios depending on the active ingredient and the desired achievement of the filament, whether it be odor, taste, or medicinal benefit. The excipient ingredients may include any one or more of the following list of ingredients for this mixture, and most preferably all of them as follows: active spray dried powder mixture, a plasticizer, arabic gum that has been colored with standard food grade dyes or colorants, a gelling agent, filler(s), flour, a binding or thickening agent (which also gives the benefit of being a stabilizer), a lubricant, and preservative(s). This final mixture is combined in stages over low heat ranging in temperature from 88.5° C.-119° C. (191.3° F.-246.2° F.) remaining conscious of active ingredient(s)' combustion temperature(s) so as to not lose active ingredient(s)' integrity. Once the added ingredients have melted and homogeneously been mixed the mixture is then removed from heat and meant to dry/cure in a cool, dry stable environment. The hardened mixture is then broken up and fed into an extruder with a die of 1.75 mm or 3 mm (diameters of standard 3D printer filaments). The extruder should be set to a temperature of approximately 70-90° C. (158° F.-194° F.). The filament that is extruded is allowed to dry/cure in a cool, dry stable environment.

When printed the edible thermoplastic filament has good mechanical properties. The tensile strength preferably ranges from about 1 to 5 MPa for ease of chewing. The Young's Modulus preferably ranges from about 65 to 1000 MPa. The texture, pliancy, and consistency of the molded edible thermoplastic filament resembles a dense rubbery texture, which encourages human consumption.

As seen in FIG. 1, a method for producing an edible 3D filament for use in a conventional 3D printer according to the invention comprises the steps of:

producing air essential oil tincture at step 110, by the substeps of, obtaining dried plant material (substep 112), and performing oil extraction on the dried plant material (substep 118).

The foregoing produces an essential oil tincture that is pure.

Next, at step 120 a water soluble polymer compound comprising of active, polyvinylpyrrolidone (PVP), starch, and a super disintegrant is prepared by mixing and spray drying these ingredients to a powder form.

At step 130 the powder-form water soluble polymer compound is then mixed with excipient ingredients comprising a plasticizer, arabic gum that has been colored with standard food grade dyes or colorants, a gelling agent, fillers, flour, a binding or thickening agent (which also gives the benefit of being a stabilizer), a lubricant and preservative. This final mixtures is heated to form an edible thermoplastic.

At step 140 the edible thermoplastic is hot-melt extruded through a die to produce a filament, and at step 150 the filament is wound onto a 3D printer filament spool.

Each of the foregoing steps is herein described below in more detail.

Step 110: Extraction of Active (Oil)

By way of example, edible cannabis oil can be extracted for medical purposes for people with cancer, epilepsy, chronic pain, and other medical conditions. One skilled in the art will readily understand that the extraction process can be used for other edible vegetable oils including herbs and spices, peppers, mushrooms, teas, essential oils, other actives such as Palcohol® (powdered alcohol), nicotine, and flavorings such as coffee. For cannabis oil the dried flower of the cannabis plant is collected (substep 112), and extracted through whatever practice is most suitable, such as an ethanolic extraction, glycerin, or CO2 extraction, etc. (substep 118).

Step 120: Prepare water soluble polymer compound by mixing active ingredient, PVP, starch, and a super disintegrant.

The active (such as cannabis oil) ingredient should be in a liquid state (liquid state can be achieved by adding food grade ethanol to active ingredient).

Starch is another ingredient of the edible thermoplastic of the present invention. The starch is preferably a modified starch, with varying ratios of citric acid to amylose to amylopectin as a matter of design choice to determine the melting temperature for hot-melt extrusion. Pea starch, potato starch, corn starch, microcrystalline cellulose, wheat starch, rice starch, and combinations thereof may also be used.

In order to provide nutritional or other supplemental benefits, the PVP may be enriched by added nutrients or other active ingredients such as essential oils, or other actives such as Palcohol® (powdered alcohol). In certain embodiments of the invention, the nutrient ingredients may include but not limited to vitamins, minerals, and amino acids: Vitamin A, vitamin B1, vitamin B2, vitamin B3, vitamin B12, vitamin C, vitamin E, vitamin D, niacin (vitamin PP), biotin (vitamin H), menadione (vitamin K), folic acid, and pyridoxine (B6), etc. Minerals which may be included such as iron, zinc, etc. Amino acids which may be included such as lysine, etc. These and other vitamins, minerals, and amino acids may be added as an active ingredient to the PVP polymer compound for producing the edible thermoplastic filament of the present invention. Plasticizers may be added to adjust texture. Plasticizers enhance the flexibility of the final 3D printed articles made from the filament. The plasticizers should be edible. Typical edible plasticizers which can be used in the present invention include glycerol, triacetine, sorbitan, corn starch and citric acids with a ratio above 1:10, guar gum, and propylene glycol.

In addition to the naturally occurring extracted plant oils, chemically modified plant proteins can be used to improve the processing flowability and physical properties of the composition. Other modifiers may also be added to the mixture to enhance the mechanical properties. Such modifiers may include carbohydrate gum such as magnesium stearate, stearic acid, sodium stearyl fumarate, hydrogenated vegetable oil, polyethylene glycol, sugars, mannitol, sorbitol, lactose, whey and yeast, microcrystalline cellulose, povidone, carpool, crospovidone, croscarmellose sodium, gellan gum, silicone dioxide, pectin, gelatin, carrageenan, carnauba wax, carob gum, agar, mannan, sodium alginate, and shellac.

The super disintegrant, such as Lachtochem® powder, a milled lactose powder likewise available from DFE pharma®, is added to this mixture to derive the desired break-down effect, which will allow filament to release active ingredient at the desired rate.

These ingredients are mixed together, and then spray dried using a spray drier such as, for example, a BÜCHI Mini Spray Dryer B-290(BÜCHI Labortechnik AG, Flawil, Switzerland). Mixture is spray dried with approximate parameters of: an intake temperature in a range of 110-130° C., an aspiration rate within a range of of 065-100%, pump #001, nozzle cleaner set at a 4, and Q-flow at 30.

Step 130: Forming Edible Thermoplastic

The powder form of the water soluble polymer compound is then mixed with excipients including: a plasticizer, arabic gum that bas been colored with standard food grade dyes or colorants, a gelling agent, fillers, flour, a binding or thickening agent (which also gives the benefit of being a stabilizer), a lubricant and preservative, which is heated to form an edible thermoplastic.

Step 140: Extrusion

The thermoplastic is then added to a hot-melt extruder. The extruder should be set to a temperature of approximately 70-90° C. (158° F.-194° F.), The extruder will produce a 3D printer filament of either 1.75 or 3 millimeter diameter (depending on size of die), the filament is dry/cured in a cool, dry stable environment.

Step 150: Wind Onto Filament Spool

The filament above is then wound onto a conventional 3D printer spool. The wound filament can then be printed from any standard 3D printer, at a temperature in a range of 70-90° C. (158° F.-194° F.).

Accordingly, the instant invention provides a 3D printer filament that incorporates an oil extract for taste, odor or medicinal benefit, and which is capable of retaining this benefit despite the repeated thermal extrusion involved in 3D printing. The edible filament is composed of an edible thermoplastic formulated to retain taste, odor and/or medicinal benefit despite repeated extrusion, and to provide the intended benefit when consumed by people or animals. This application is intended to cover any variations, uses, or adaptations of the invention using its general principles. Further, this application is intended to cover such departures from the present disclosure as come within known or customary practice in the art to which this invention pertains.

We claim:

1. A method for producing an edible filament for use in a 3D printer, comprising the steps of:
producing an essential oil by the substeps of:
obtaining dried plant material, and
performing an extraction on said plant material to produce an active ingredient comprising an essential oil there from;
preparing a water soluble polymer compound by mixing approximately 1 part said active ingredient, approximately 3.5 parts polyvinylpyrrolidone (PVP), approximately 1.5 parts starch, and approximately 1 part super disintegrant;
spray drying said water soluble polymer compound;
mixing and heating said powderized water soluble polymer compound with a plasticizer, colored arabic gum, a gelling agent, filler, flour, a binding or thickening agent, a lubricant, and a preservative, thereby forming an edible thermoplastic;
hot-melt extruding said edible thermoplastic through a die to produce a filament; and
winding said filament on a spool.

2. The method of claim 1, wherein said step of obtaining dried plant material comprises obtaining dried cannabis.

3. The method of claim 2, wherein said step of performing an extraction on said dried cannabis comprises extracting edible cannabis oil there from.

4. The method of claim 1, wherein said step of hot-melt extruding said edible thermoplastic comprises extruding through a die having a 1.75 mm diameter.

5. The method of claim 1, wherein said step of hot-melt extruding said edible thermoplastic comprises extruding through a die having a 3 mm diameter.

6. The method of claim 1, wherein said step of hot-melt extruding said edible thermoplastic comprises extruding through a die at a temperature within a range from approximately 70-90° C. (158° F.-194° F.).

7. A method for producing an edible filament for use in a 3D printer, comprising the steps of:
    obtaining an active ingredient comprising any one from among a group consisting of an essential oil, powdered alcohol and nicotine;
    preparing a water soluble polymer compound by mixing approximately 1 part said active ingredient with approximately 3.5 parts polyvinylpyrrolidone (PVP), approximately 1.5 parts starch, and approximately 1 part super disintegrant;
    spray drying said water soluble polymer compound to a powderized form;
    mixing and heating said powderized water soluble polymer compound with any one or more excipient ingredients from among the group consisting of a plasticizer, arabic gum, a gelling agent, a filler, flour, a binding agent, a thickening agent, a lubricant, and a preservative, to form a hardened edible thermoplastic;
    hot-melt extruding said edible thermoplastic through a die to produce a filament; and
    winding said filament on a spool.

8. The method of claim 7, wherein said active ingredient comprises edible cannabis oil.

9. The method of claim 7, wherein said step of obtaining said active ingredient further comprises the substeps of,
    obtaining dried plant material, and performing an extraction on said dried plant material to produce said essential oil therefrom.

10. The method of claim 9, wherein said substep of obtaining dried plant comprises obtaining dried cannabis flowers.

11. The method of claim 10, wherein said step of performing an extraction on said dried cannabis flowers comprises extracting edible cannabis oil there from.

12. The method of claim 7, wherein said step of hot-melt extruding said edible thermoplastic comprises extruding through a die having a 1.75 mm diameter.

13. The method of claim 7, wherein said step of hot-melt extruding said edible thermoplastic comprises extruding through a die having a 3 mm diameter.

14. The method of claim 7, wherein said step of hot-melt extruding said edible thermoplastic comprises extruding through a die at a temperature within a range from approximately 70-90° C. (158-194° F.).

15. The method of claim 7, wherein said step of mixing and heating said powderized water soluble, polymer compound comprises mixing with all excipient ingredients including a plasticizer, arabic gum, a gelling agent, a filler, flour, a binding agent, a thickening agent, a lubricant, and a preservative, to form a hardened edible thermoplastic.

* * * * *